US008370857B2

(12) United States Patent
Kamii et al.

(10) Patent No.: US 8,370,857 B2
(45) Date of Patent: Feb. 5, 2013

(54) DEVICE CONTROLLER

(75) Inventors: Hideyuki Kamii, Toyama (JP); Mitsuru Toyoda, Toyama (JP)

(73) Assignee: Media Logic Corp., Toyama (JP)

( * ) Notice: Subject to any disclaimer, the term of this patent is extended or adjusted under 35 U.S.C. 154(b) by 602 days.

(21) Appl. No.: 12/596,443

(22) PCT Filed: May 15, 2007

(86) PCT No.: PCT/JP2007/059941

§ 371 (c)(1), (2), (4) Date: Oct. 18, 2009

(87) PCT Pub. No.: WO2008/136133

PCT Pub. Date: Nov. 13, 2008

(65) Prior Publication Data

US 2010/0115535 A1 May 6, 2010

(30) Foreign Application Priority Data

Apr. 20, 2007 (JP) ................................ 2007-112043

(51) Int. Cl.
*G06F 13/00* (2006.01)
*G06F 17/30* (2006.01)

(52) U.S. Cl. ......................... 719/321; 707/705; 711/111

(58) Field of Classification Search ................. 707/705; 711/111; 719/321
See application file for complete search history.

(56) References Cited

U.S. PATENT DOCUMENTS 5,519,853 A 5/1996 Moran et al.
5,732,285 A 3/1998 Harrison et al.
6,516,401 B2 * 2/2003 Fukuhisa et al. .............. 711/218
6,609,177 B1 * 8/2003 Schlumberger et al. ...... 711/122
7,039,728 B2 * 5/2006 Tamura et al. .................... 710/5
7,287,137 B2 * 10/2007 Ji et al. .......................... 711/162
7,409,515 B2 * 8/2008 Hanai et al. ................... 711/165
7,711,797 B1 * 5/2010 Huang .......................... 709/218
2002/0091902 A1 7/2002 Hirofuji (Continued)

FOREIGN PATENT DOCUMENTS

JP 04-130523 5/1992
JP 07-073107 3/1995

(Continued)

OTHER PUBLICATIONS

International Search Report for corresponding application No. PCT/JP2007/059941 mailed Aug. 14, 2007.

(Continued)

*Primary Examiner* — Charles E Anya
(74) *Attorney, Agent, or Firm* — Renner, Otto, Boisselle & Sklar, LLP

(57) ABSTRACT

A device controller that improves transfer speed when the total data amount to be transferred exceeds a predetermined amount, without requiring a special configuration in the device.

The device controller includes a cache memory that caches data received from an application software or device driver and data received from a target device, and a control unit that transfers the data cached in the cache memory to the target device and the application software or device driver. The control unit receives a read or write request from upstream and caches the transfer data in the cache memory. During writing, the data received from upstream is cached, and once a certain amount of data has been collected, it is sent downstream. During reading, a certain amount of data is collectively read out from downstream and sent upstream.

8 Claims, 13 Drawing Sheets

U.S. PATENT DOCUMENTS

| | | | | |
|---|---|---|---|---|
| 2003/0115410 | A1 | 6/2003 | Shriver | |
| 2005/0223175 | A1 * | 10/2005 | Hepner et al. | 711/137 |
| 2006/0248278 | A1 * | 11/2006 | Beeston et al. | 711/137 |
| 2006/0271740 | A1 | 11/2006 | Mark et al. | |

FOREIGN PATENT DOCUMENTS

| | | | |
|---|---|---|---|
| JP | 10-040170 | | 2/1998 |
| JP | 2000-353126 | | 12/2000 |
| JP | 2001-125749 | | 5/2001 |
| JP | 2001-154811 | | 6/2001 |
| JP | 2002-207620 | A | 7/2002 |
| JP | 2002-344537 | | 11/2002 |
| JP | 2003-337722 | | 11/2003 |
| JP | 2006-215891 | | 8/2006 |
| JP | 2006-309579 | | 11/2006 |
| WO | 00/43854 | A3 | 7/2000 |

OTHER PUBLICATIONS

Supplementary European Search Report for corresponding European Application No. 07743376.1 dated Jun. 22, 2010.

* cited by examiner

PRIOR ART

PRIOR ART

DEVICE CONTROLLER

TECHNICAL FIELD

The present invention relates to a device controller that controls an external peripheral device of a personal computer, and particularly relates to a device controller that accelerates the speed of data transfer.

RELATED ART

The operating system (called "OS" hereinafter) of a personal computer (called "PC" hereinafter) requires software called a device driver in order to properly recognize and control a peripheral device.

Many standard device drivers are provided in the OSs installed in recent PCs. Therefore, when a standard peripheral device is connected, the OS automatically allocates a standard device driver thereto, and recognizes and controls the connected peripheral device.

However, standard device drivers are not optimized for various types of peripheral devices, and thus if a peripheral device that operates at a speed that is higher than the transfer speed controlled by such a device driver (for example, an external HDD or the like that reads or writes at high speed), the speed will be restricted by the standard device driver. There are also cases where an application software restricts the speed.

In particular, with Windows®, which is a general OS, when a USB mass storage device (an external HDD or the like) is connected and data transfer carried out, a standard Windows® application software or device driver divides the data into 64 kB units, and the USB mass storage driver adds information such as commands, statuses, or the like to each unit of data into which the data has been divided. Processing this command or status information takes a long time (several hundreds of μsecs), which causes a drop in the data transfer speed.

FIG. 1 illustrates a function block diagram of various drivers provided in an OS. In FIG. 1, an application software 51, a generic disk driver 52, a USB mass storage driver 53, and a USB host controller driver 54 are functional units provided in an OS.

The application software 51 executes read or write requests to a USB mass storage device 55 (for example, an external HDD) via the various device drivers. FIG. 1 illustrates an example in which the application software 51 executes a write request and transfers data. The application software 51 executes a write request to the generic disk driver 52 and transfers data. The generic disk driver 52 transfers this data to the USB mass storage driver 53, which is downstream. At this time, the upper limit on the data transfer size for the USB mass storage driver 53 is 64 kB, and therefore the generic disk driver 52 divides the data into 64 kB units. The USB mass storage driver 53 adds commands and statuses to the data divided into the 64 kB units, and sequentially transfers the 64 kB units to the USB host controller driver 54. The USB host controller driver 54 sequentially transfers the commands, data, and statuses to the USB mass storage device 55 through a USB bulk transfer method.

FIG. 2 is a schematic diagram illustrating the structure of the data transferred by the generic disk driver 52 and the USB mass storage driver 53 (a bulk-only protocol). As shown in FIG. 2, the generic disk driver 52 divides the data into 64 kB units, and the USB mass storage driver 53 adds commands and statuses to each unit of data and sequentially transfers those units of data to the USB host controller driver 54. Furthermore, the USB host controller driver 54 sequentially transfers the commands, data divided into 64 kB units, and statuses to the USB mass storage device 55. In this manner, the application software 51 writes into the USB mass storage device 55.

The time in which the USB mass storage driver 53, USB host controller driver 54, and USB mass storage device 55 process the commands and statuses is, in a USB 2.0 environment, approximately 500 μsec. Such being the case, adding the time required to process the commands and statuses with every 64 kB data transfer results in a delay of approximately 500 μsec, and thus if the total amount of data to be transferred is greater than 64 kB, the data transfer speed will drop.

In addition, as shown in FIG. 1, even if the application software 51 directly transfers the data to the USB mass storage driver 53, the upper limit of the data transfer size in the USB mass storage driver is 64 kB; therefore, the application software 51 divides the data into 64 kB units, and the USB mass storage driver 53 adds commands and statuses to each data unit and sequentially transfers those data units to the USB host controller driver 54. Note, however, that even when no upper limit of 64 kB on the data transfer size exists in the driver and the application software 51 transfers data of a size greater than 64 kB, there are cases where the application software divides the data into 64 kB units (as with, for example, Windows® Explorer and the like).

Thus a problem in that the transfer speed drops when the total amount of data to be transferred exceeds a predetermined amount has persisted.

Meanwhile, providing a buffer in the device controller, caching data in this buffer, and then transferring the data collectively exists as a conventional technique for improving transfer speeds between a PC and a device (see, for example, Patent Document 1). The apparatus according to Patent Document 1 executes a write process every time the total size of the data to be transferred exceeds the size of the buffer, and thus data that exceeds the buffer size is transferred directly, without passing through the buffer.

In addition, a technique that improves transfer speeds by providing multiple buffers and caching data from an upstream driver in one buffer while performing a process for transferring data from another buffer (see, for example, Patent Document 2) and a technique that caches commands, data, and statuses and processes the commands, data, or statuses collectively (see, for example, Patent Document 2) have been proposed.

Furthermore, a technique has been proposed, for cases such as the above-described case where it is necessary to divide the data in the PC and the device and process that divided data, whereby the device controller in the PC collects the data to a certain point and transfers the collected data, and a control unit in the device then re-divides the transferred data and processes that divided data (see, for example, Patent Document 4).

Patent Document 1: JP H4-130523A

Patent Document 2: JP 2002-344537A

Patent Document 3: JP 2006-215891A

Patent Document 4: JP 2001-154811A

DISCLOSURE OF INVENTION

Problem the Invention is to Solve

However, the apparatus disclosed in Patent Document 1 is not capable of accelerating transfer speeds in the case where an application software, a driver, or the like divides the data. Meanwhile, while the apparatuses disclosed in Patent Document 2 and Patent Document 3 are capable of improving the processing speed of a transfer unit, those apparatuses are not capable of accelerating transfer speeds in the case where an application software, a driver, or the like divides the data.

Furthermore, with the calculator system disclosed in Patent Document 4, it is necessary for a control unit in the device to re-divide data and process that divided data. A configuration for consolidating the various divided requests and performing data transfer during reads is also necessary in the control unit of the device.

It is therefore an object of the present invention to provide a device controller that improves transfer speeds in cases where the total amount of data to be transferred is a predetermined amount, without requiring a special configuration in the device.

Means to Solve the Problem

The device controller of the present invention is a device controller connected between an application software or device driver and a target device, and includes: a cache memory that caches data received from the application software or device driver and data received from the target device; and a control unit that transfers the data cached in the cache memory to the target device and the application software or device driver. The control unit receives one or multiple read or write requests from the application software or device driver, sets the one or multiple read or write requests as a single consolidated read or write request that contains the multiple requests, and causes the data to be cached in the cache memory by transferring the consolidated read or write request to the target device.

In other words, read or write requests received from the application software or device driver are consolidated and transferred to the device. Through this, data received from the application software or device driver is cached, and a certain amount of data is then collectively transferred to the target device. Conversely, a certain amount of data is collectively received from the target device, and is sequentially transferred to the application software or device driver as cached data. Even in the case where the amount of transferred data is restricted by the application software or device driver, and thus divided data is transferred, a certain amount of data is collected and a single (or reduced number of) command and status is issued and the data transferred, thereby realizing higher speeds. In addition, when a read request has been received, if the data corresponding to that request is stored in the cache memory, that data can be transferred. If data transferred once is cached, that data can be transferred at high speeds the next time a read request for the same data is received. Furthermore, generally speaking, random access in storage devices follows the seek operations of the head, which causes a decrease in the transfer speeds; however, by transferring data from a cache memory as described above, the frequency at which read requests are issued to the target device can be reduced, and the frequency at which random accesses occur in the target device can also be reduced, making it possible to realize further higher speeds. Note that in the case where the target device is USB mass storage, the standard USB mass storage driver may be replaced by a device controller having this configuration, or a device controller having this configuration may be connected below the standard USB mass storage driver.

In a preferable aspect of the present invention, upon receiving a read or write request from the application software or device driver, the control unit predicts the read or write requests that will occur thereafter, sets the predicted read or write requests as the single consolidated read or write request that contains multiple requests, and determines the data to be cached in the cache memories based on the predicted details.

When a read or write request has been received, the read or write requests that will occur thereafter are predicted, and the size of the cache memory to be secured is determined. Securing data in the cache memory in advance makes it possible to realize higher speeds particularly during reads.

A further preferable aspect of the present invention includes a history recording unit that records a history of the read or write requests received from the application software or device driver. The control unit predicts the read or write requests that will occur thereafter based on the history of the read or write requests recorded in the history recording unit.

In this configuration, a history of the read or write requests is recorded. This history may be recorded in a RAM, or may be recorded in a peripheral device or in a PC. Recording the history in a peripheral device or a PC makes it possible to refer to the history when the peripheral device is connected, the PC is restarted, and so on. The read or write requests that will occur thereafter are predicted by referring to this history. For example, in the case where a history that matches the present read or write request is present, histories related thereto (for example, items in which sector numbers, transfer block numbers, or the like are related) are consolidated, and the requests are taken as a single continuous read or write request; the read or write requests that will occur thereafter are then predicted.

In a further preferable aspect of the present invention, the control unit includes an upper control unit connected to the application software or device driver, and a lower control unit connected to the target device; upon receiving a read or write request from the application software or device driver, the upper control unit sends information indicating the details of the request to the lower control unit; and the lower control unit predicts the read or write requests that will occur thereafter based on the information indicating the details of the request.

In this configuration, an upper control unit and a lower control unit are provided. Upon receiving a read or write request from the application software or device driver, the upper control unit sends the details thereof to the lower control unit. The lower control unit predicts the read or write requests that will occur thereafter based on the received details. Even in the case where a standard device driver (for example, a USB mass storage driver) is present between the upper control unit and the lower control unit, and that standard device driver restricts the amount of transferred data and thus transfers divided data, the read or write requests of the application software or device driver are sent from the upper control unit, and therefore the details of the data that is to be transferred can be predicted with high accuracy.

In addition, the device controller according to the present invention is a device controller connected between an application software or device driver and a target device, and includes: a control unit that includes an upper control unit connected to the application software or device driver, and a lower control unit connected to the target device. Upon receiving a read or write request from the application software or device driver, the upper control unit transfers the request directly to the lower control unit; and upon receiving a read or write request directly from the upper control unit, the lower control unit transfers data from the target device and the application software or device driver based on that read or write request.

In this configuration, the upper control unit transfers read or write requests directly to the lower control unit. Based on this request, the lower control unit transfers data directly downstream/upstream. Because data is not divided and transferred between the application software or driver and the target device, higher speeds can be realized. Note that while various situations can be considered as the trigger for transferring read or write requests directly, the trigger may be, for example, whether or not the amount of data to be transferred is greater than a predetermined amount.

A preferable aspect of the present invention further includes a cache memory that caches data transferred by the control unit from the target device and the application software or device driver. Upon receiving the write request, the control unit caches data corresponding to that request in the cache memory, and upon receiving the read request, the control unit transfers data corresponding to that request to the application software or device driver if that data is cached in the cache memory.

In this configuration, a cache memory that caches the data to be transferred is provided. Upon receiving a read request, the control unit transfers the data corresponding to that request if that data is present in the cache memory. Caching the data transferred once makes it possible to transfer that data at high speeds the next time a read request for the same data is received.

A further preferable aspect of the present invention includes a setting unit that sets the capacity and number of the cache memories. When the control unit has received a read or write request from the application software or device driver, the setting unit sets the capacity and number of the cache memories based on the content of the data to be read or written, the total size of the data to be read or written, the type of the target device or the transfer speed of the target device, or a combination of any of these.

In this configuration, the capacities and number of cache memories are set. Increasing the capacity of a cache memory makes it possible to increase the amount of data that can be transferred at once, whereas increasing the number of cache memories makes it possible to perform processes in parallel. The conditions for setting the number and capacities of cache memories are based on the details of the data to be read or written, the total amount of data to be read or written, the type of the target device or the transfer speed of the target device, and so on.

Effects of the Invention

According to the present invention, data that exceeds a data amount restricted by an application software, a device driver, or the like can be transferred, and therefore transfer speeds can be improved.

DESCRIPTION OF REFERENCE NUMERALS

1—PC
2—External HDD

BEST MODE FOR CARRYING OUT THE INVENTION

Windows® can be given as a common OS provided in PCs. The present embodiment shall describe, with reference to the drawings, a case in which an external HDD that uses a USB interface is connected to a PC in which Windows® XP is installed. Note that in the present invention, the OS type, the type of connected device, and the interface are not limited to those mentioned above.

Figure 3:
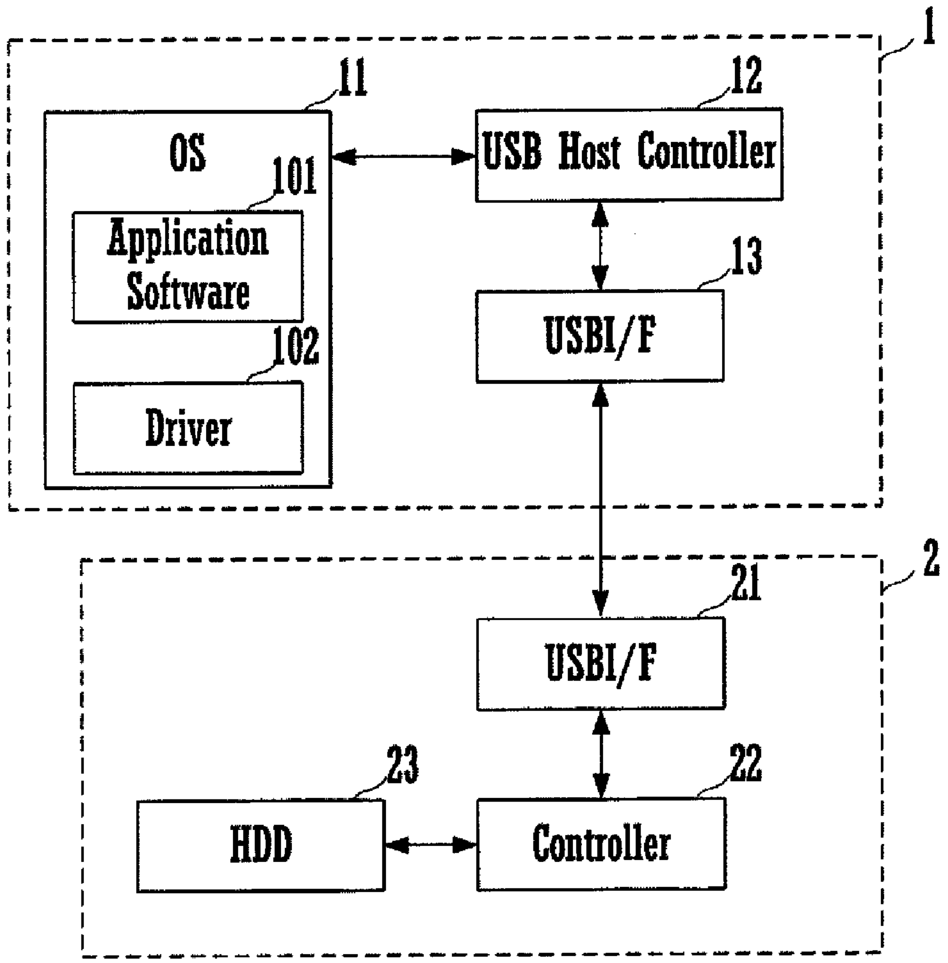
FIG. 3 is a block diagram illustrating a PC and an external HDD according to an embodiment.

FIG. 3 is a block diagram illustrating a PC and an external HDD according to the present embodiment. A PC 1 and an external HDD 2 are connected by a USB interface (I/F). The PC 1 is provided with an application software 101 that performs various processes within an OS 11, which performs overall management, and a driver 102 that includes various drivers for operating peripheral devices. The application software 101 reads data stored in the external HDD 2 and writes data into the external HDD 2 via the driver 102, a USB host controller 12, and a USB I/F 13.

A controller 22 receives read or write requests to the external HDD 2 via the USB I/F 21, and reads data stored in an HDD 23 or writes data into the HDD 23 in response thereto.

Figure 4:
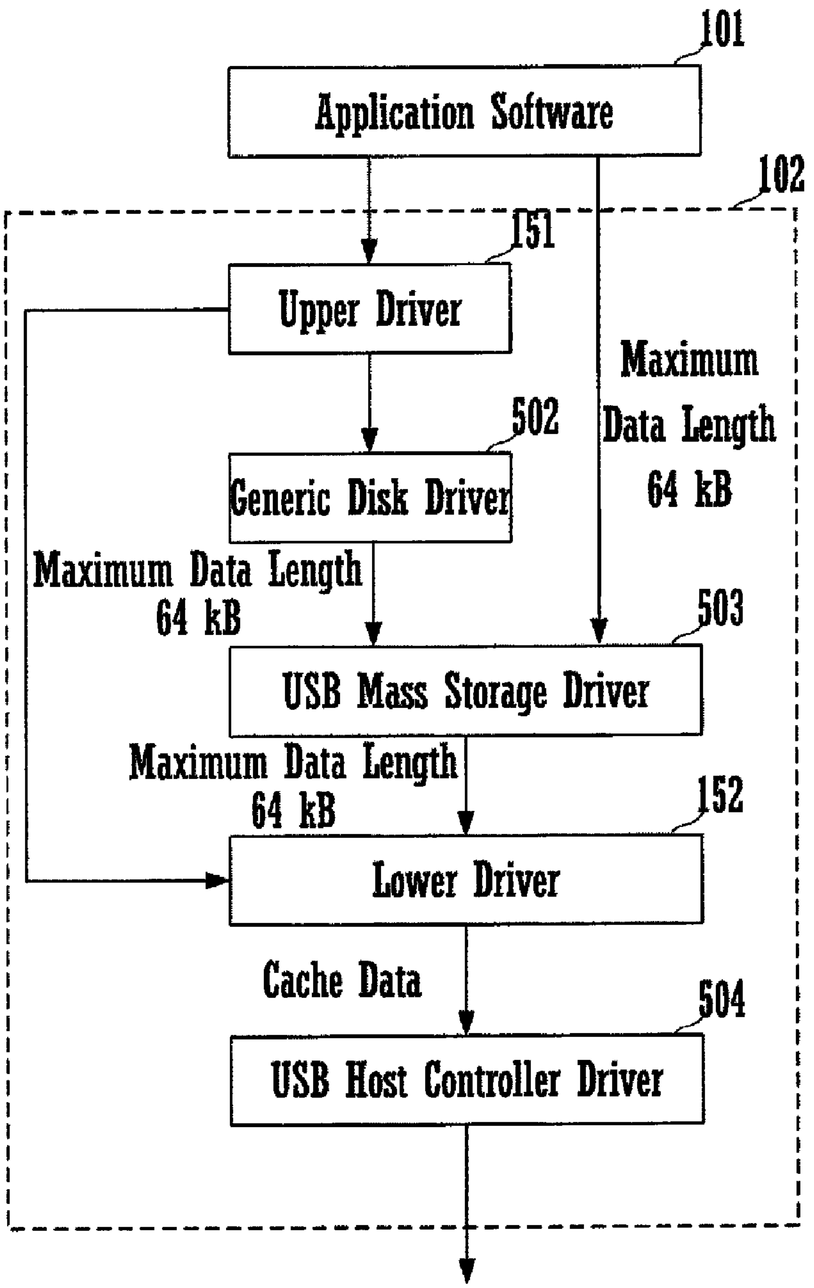
FIG. 4 is a function block diagram of various drivers provided in an OS 11.

FIG. 4 is a function block diagram of various drivers provided in an OS 11. In FIG. 4, the application software 101, a generic disk driver 502, a USB mass storage driver 503, a USB host controller driver 504, an upper driver 151, and a lower driver 152 are functional units provided within the OS 11. In actuality, these functional units are implemented as software installed in the OS 11.

The application software 101 executes read or write requests to the external HDD 2 via the various drivers included in the driver 102. FIG. 4 illustrates an example in which the application software 101 executes a write request and data is transferred.

The application software 101 executes a write request to the upper driver 151 and transfers the data to be written to the HDD 23 of the external HDD 2. The upper driver 151 transfers this write request and the data to the generic disk driver 502, which is downstream, and sends, to the lower driver 152, information indicating the data amount and that there was a write request from the application software 101, as access information. The access information transferred to the lower driver 151 by the upper driver 152 shall be described in detail later.

The generic disk driver 502 transfers the data received from the upper driver 151 to the USB mass storage driver 503. At this time, the upper limit on the data transfer size in the USB mass storage driver 503 is 64 kB, and therefore the generic disk driver 502 divides the data into 64 kB units and transfers those data units to the USB mass storage driver 503.

Figure 2:
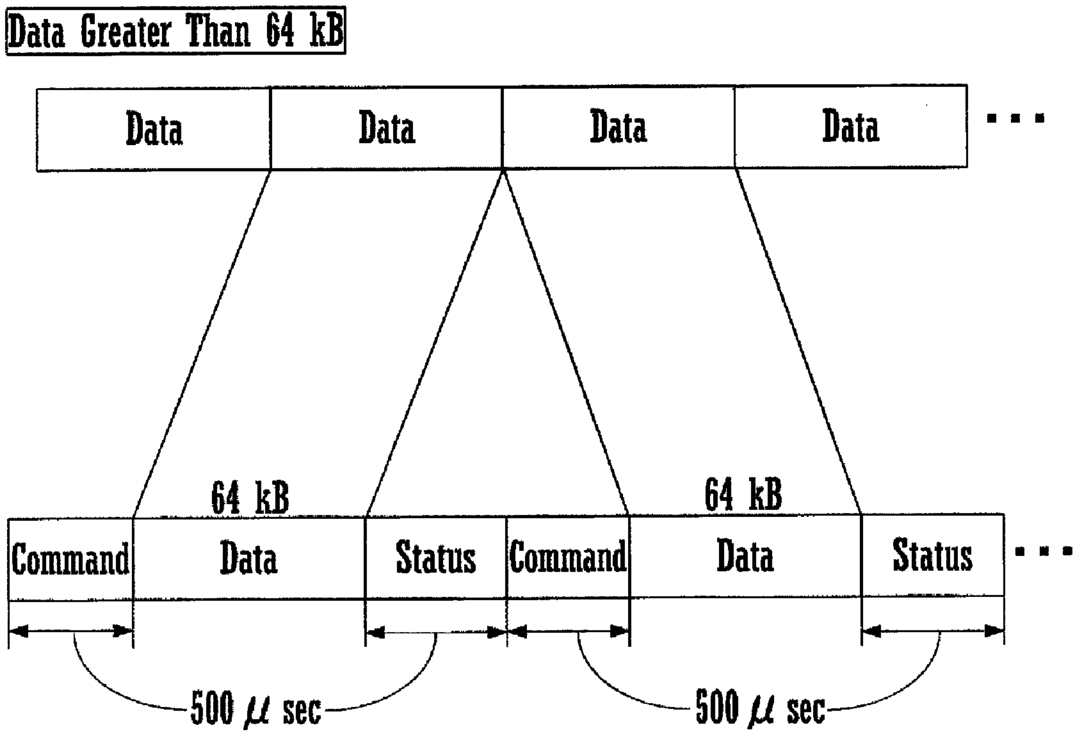
FIG. 2 is a schematic diagram illustrating the bulk-only protocol structure.

The USB mass storage driver 503 executes data transfer according to the bulk-only protocol (see FIG. 2), and thus adds commands and statuses to the data divided into 64 kB units and sequentially transfers the data units to the lower driver 152.

The lower driver 152 caches the data transferred from the USB mass storage driver 503, and transfers the cached data to the USB host controller driver 504 according to a predetermined timing. The USB host controller driver 504 transfers this data to the external HDD 2. Because the lower driver 152 caches the data transferred from the USB mass storage driver 503 and collectively transfers the data to the USB host controller driver 504 once the data has reached a certain size (more than 64 kB), the commands and statuses only need to be issued once (or less than when adding the commands and statuses to every 64 kB data unit). Therefore, delay caused by the processing time of the commands and statuses is kept to a minimum. Note that with the data transferred from the generic disk driver 502 to the lower driver 152, commands and statuses are added to every 64 kB unit, but because this transfer is a memory (RAM) transfer carried out in the OS, the transfer is extremely fast compared to the speed when transferring data to the external HDD 2 (that is, is dependent on the RAM transfer speed).

Furthermore, while there are cases in this embodiment where the application software 101 transfers data directly to the USB mass storage driver 503, the upper limit on the data transfer size of the USB mass storage driver 503 is, as described above, 64 kB, and therefore the application software 101 divides the data into 64 kB units and transfers the data, and the USB mass storage driver 503 transfers the data to which commands and statuses have been added. Even in this case, the lower driver 152 caches the data before transferring it downstream, and therefore delay caused by the processing time of the commands and statuses is kept to a minimum.

Figure 5:
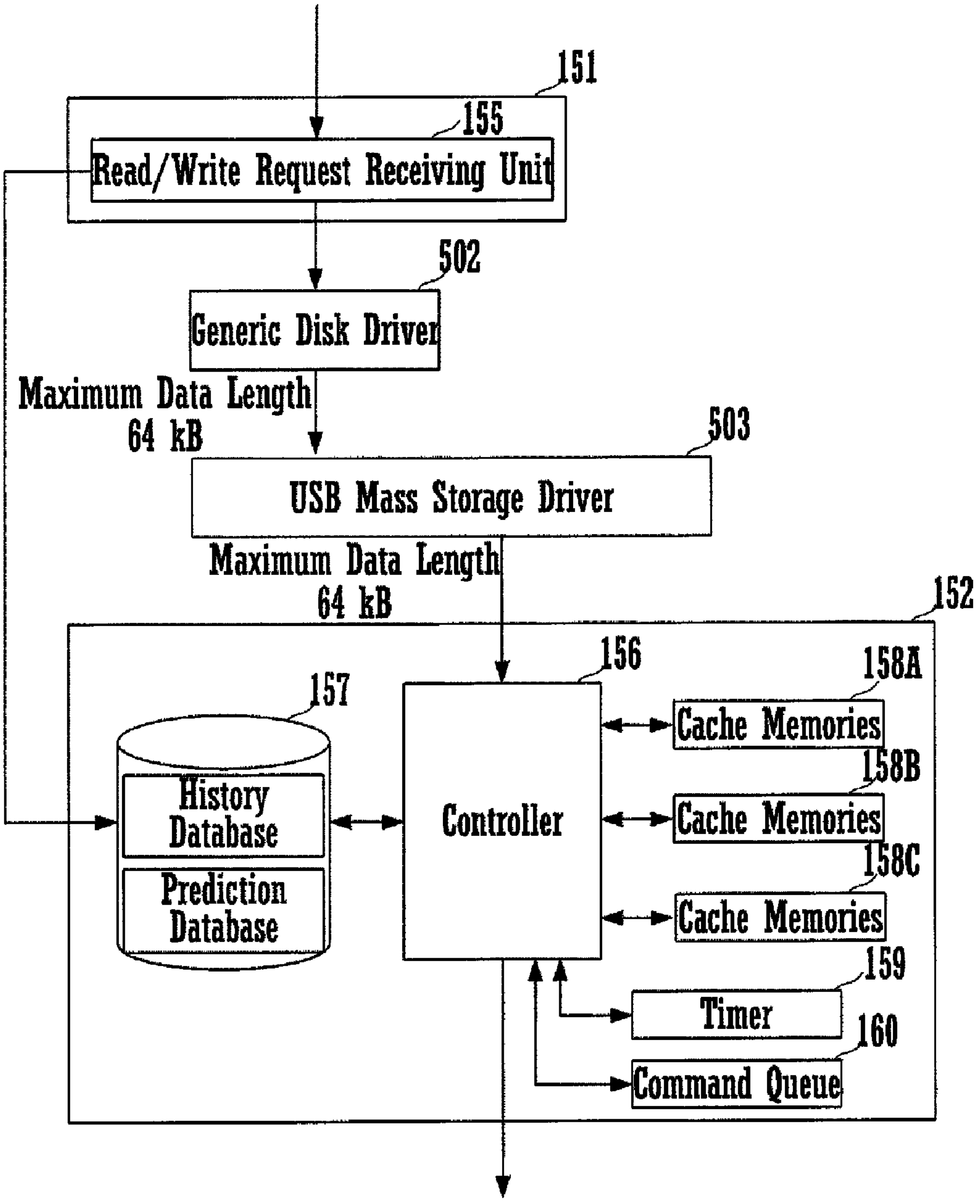
FIG. 5 is a function block diagram illustrating detailed configurations of an upper driver 151 and a lower driver 152.

Next, the operations performed by the upper driver 151 and the lower driver 152 shall be described in detail. FIG. 5 is a function block diagram illustrating detailed configurations of the upper driver 151 and the lower driver 152. Note that elements common with FIG. 4 are given the same reference numerals, and descriptions thereof are omitted. The upper driver 151 includes a read/write request receiving unit 155. Meanwhile, the lower driver 152 includes a controller 156, a database 157, cache memories 158A to 158C, a timer 159, and a command queue 160.

The read/write request receiving unit 155 receives read or write requests from the application software 101. The read/write request receiving unit 155 transfers the requests to the generic disk driver 502, which is downstream, and sends the content of the requests to the lower driver 152 as access information. The read or write requests are transferred to the lower driver 152 via the generic disk driver 502 and the USB mass storage driver 503.

LBA (Logical Block Addressing, or a sector specification number in the HDD), a transferred block number, a transfer direction, and so on are described in the access information. The transferred block number indicates the size of the transferred data. The transfer direction is information indicating whether the transfer is downstream to upstream (a read) or upstream to downstream (a write).

This access information is stored in the database 157 of the lower driver 152 as a prediction database. The controller 156 of the lower driver 152 refers to the database 157 upon receiving a read or write request from the USB mass storage driver 503. The size of the transferred data can be predicted by referring to the prediction database.

The controller 156 also stores the read or write requests received from the USB mass storage driver 503 in the database 157 as a history database. The history database is used by the controller 156 when creating or modifying the prediction database. In other words, when a read or write request has been received from the USB mass storage driver 503, a past history database is referred to, and an item in which some or all of the LBA, transferred block number, and transfer direction match (or are similar) is copied as the prediction database. In addition, when a matching history is present, histories related thereto (for example, an item for which it can be determined, based on the LBA and the transferred block number, that sequential requests have been made) can be collected and stored in the prediction database as a single command. Note that although the history database is shown in FIG. 5 as being stored within the database 157 and then temporarily stored in the RAM, the history database may be stored within the OS 11 of the PC 1 or the HDD 23 of the external HDD 2. Through this, past histories can be referred to even when the external HDD 2 is reconnected, the PC 1 is restarted, and so on.

If the request transferred from the USB mass storage driver 503 is a write request, the controller 156 can predict the size of the transferred data by referring to the transferred block number in the prediction database. At this time, if the upper driver 151 has sent the access information to the lower driver 152 and that information has been stored in the prediction database, the amount of transferred data (of all the data to be written) can be predicted. In the case where the controller 156 has predicted a data transfer of more than 64 kB, the controller 156 stores the data transferred from upstream in one of the cache memories 158A to 158C.

The cache memories 158A to 158C are areas formed virtually in the RAM, and the number and capacities thereof are set by the controller 156. Although the number and capacities of the cache memories can be set as deemed appropriate, in the example of FIG. 5, three cache memories are prepared, and the capacities of each are set to 1 MB. Note that the number and capacities of the cache memories can be changed during operation. The number and capacities of the cache memories may be made so as to be set manually by a user, or may be changed as deemed appropriate based on the operational state, as shall be described later.

As described above, the controller 156 sequentially stores the data transferred from upstream into one of the cache memories 158A to 158C. A cache memory in which data to be written has been stored becomes a write cache memory. However, because data to which commands and statuses have been added to every 64 kB unit is transferred from the USB mass storage driver 503, the controller 156 returns dummy command completes to the USB mass storage driver 503 each time 64 kB of data has been received.

The controller 156 executes a write request to the USB host controller driver 504, which is downstream, at a predetermined timing, and transfers the data of the write cache memory. This “predetermined timing” refers to the timing at which the write cache memory has become full, or a timing determined by an interrupt performed by the timer 159. The controller 156 operates the timer 159 when a write request has been received from the USB mass storage driver 503. In addition, the controller 156 executes a write request to the USB host controller driver 504 when the write cache memory has become full as well, and transfers the data of the write cache memory.

Note that when other processes are being performed downstream below the USB host controller driver 504, the controller 156 temporarily registers the write request in the command queue 160, and then executes the write request later, when the downstream processing has ended. Note also that if there is no timer, the content of the write cache memory is held as-is, and is not written into the HDD 23; therefore, if an error occurs in this state (for example, the USB cable is disconnected, the PC 1 freezes, or the like), the data that originally was to be written into the HDD 23 would be discarded, causing damage such as file corruption. A timer is used for this reason, and by writing the content of the write cache memory when, for example, a state in which no commands have been issued for a set amount of time continues, file corruption caused by errors can be prevented.

Data is written from the application software 101 in the manner described thus far. Next, an example in which the application software 101 executes a read request and transfers data shall be described with reference FIG. 6.

Figure 6:
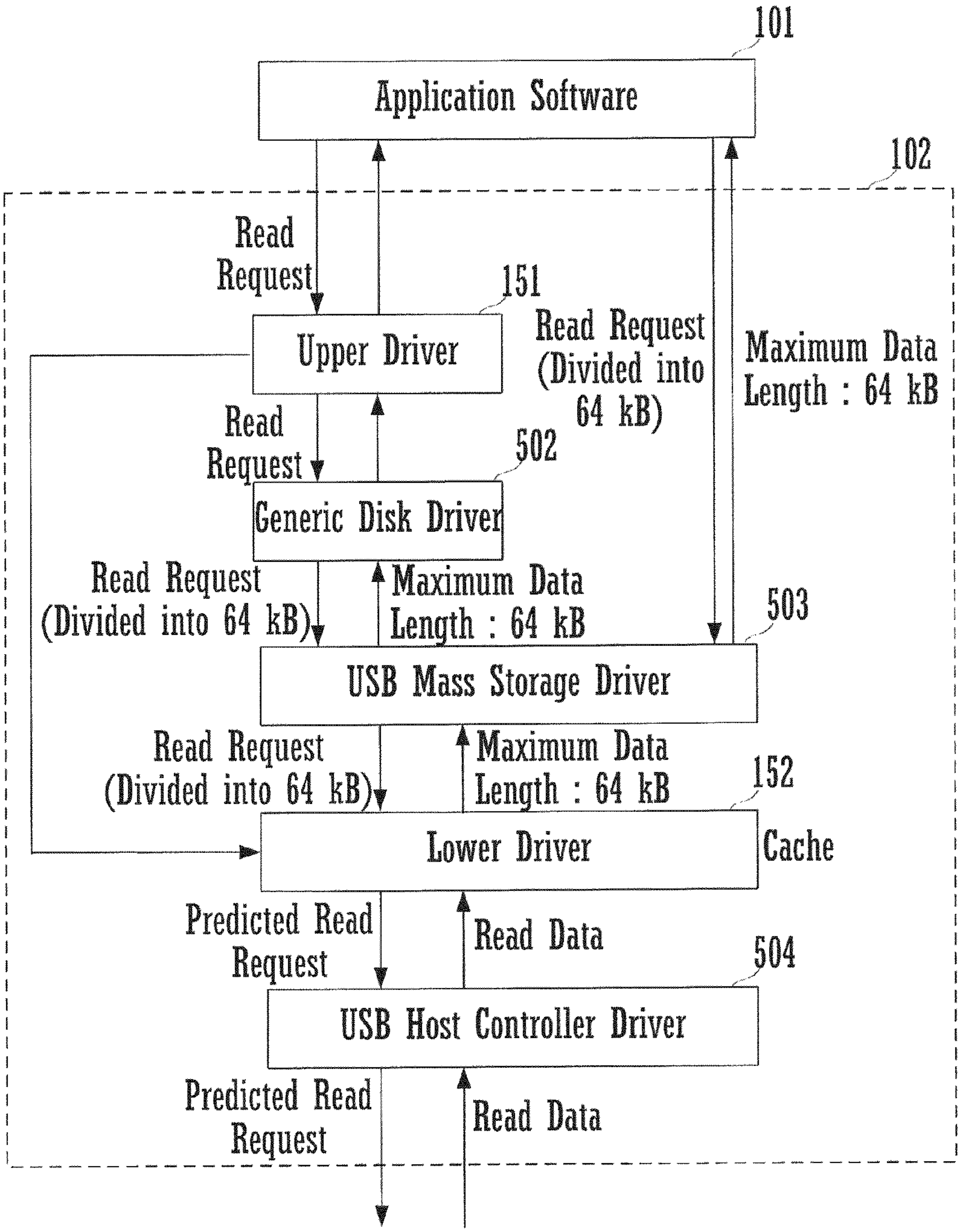
FIG. 6 is a function block diagram of various drivers provided in an OS 11.

FIG. 6 is a functional block diagram of various drivers provided in an OS 11. Note that elements common with FIG. 4 are given the same reference numerals, and descriptions thereof are omitted.

First, the application software 101 executes a read request to the upper driver 151. The upper driver 151 transfers this request to the generic disk driver 502, which is downstream, and sends information indicating that there has been a read request from the application software 101 (access information) to the lower driver 152.

The generic disk driver 502 transfers the read request received from the upper driver 151 to the USB mass storage driver 503. At this time, the upper limit on the data transfer size in the USB mass storage driver 503 is 64 kB, and therefore the generic disk driver 502 divides the read request into 64 kB units. The USB mass storage driver 503 then transfers the read request, which has been divided into 64 kB units, to the lower driver 152.

When the read request that has been divided into 64 kB units has been received from the USB mass storage driver 503, the lower driver 152 predicts that sequential read requests will be received thereafter, and executes a predicted read request to the USB host controller driver 504 so as to transfer data of a certain size. The USB host controller driver 504 reads out a certain amount of data from the HDD 23 of the HDD 2 based on this predicted read request. This read data is cached in the lower driver 152. The lower driver 152 sequentially transfers the cached data upstream in accordance with read requests received from the USB mass storage driver 503. The "certain amount" may be set as deemed appropriate, but if the amount of the transfer is too large, the transfer speed will decrease. In other words, the application software stands by until the end of the transfer and cannot commence the transfer of the cached data upstream until confirming a status indicating that the transfer has ended correctly; this causes a drop in the transfer speed. It is also necessary to increase the size of the read cache memory.

Therefore, when the controller 156 first receives a 64 kB (or less; the size may be 32 kB or the like) read request, the controller 156 reads out and caches a predetermined multiple's worth of data (for example, 4×32 kB, or 128 kB). In the case where this cached data is ultimately to be transferred upstream in its entirety, a predetermined multiple's worth of data (for example, 4×128 kB, or 512 kB) is furthermore read out. In this manner, the amount of cached data is sequentially increased in size, thereby making it possible to set the size of the read cache memory in a favorable manner while suppressing transfer times.

As described thus far, the lower driver 152 reads out a certain amount of data from the external HDD 2 once and caches that data; therefore, the commands and statuses only need to be issued to the external HDD 2 once (or less than when adding the commands and statuses to every 64 kB data unit). Therefore, delay caused by the processing time of the commands and statuses is kept to a minimum. Note that although the data transferred from the lower driver 152 to the generic disk driver 502 is divided into 64 kB units, this transfer is a memory (RAM) transfer carried out in the OS, and thus this transfer is extremely fast compared to the speed when transferring data to the external HDD 2 (that is, is dependent on the RAM transfer speed).

Details of the operations performed by the upper driver 151 and the lower driver 152 when a read request is issued as mentioned above shall be described hereinafter with reference FIG. 5. The read/write request receiving unit 155 receives a read request from the application software 101. The read/write request receiving unit 155 transfers the request to the generic disk driver 502, which is downstream, and sends the content of the request to the lower driver 152 as access information. The read request is transferred to the lower driver 152 via the generic disk driver 502 and the USB mass storage driver 503. Note that the read request transferred from the generic disk driver 502 and the USB mass storage driver 503 is divided into a read request in 64 kB units.

This access information sent by the upper driver 151 is stored in the database 157 of the lower driver 152 as a prediction database. The controller 156 of the lower driver 152 refers to the database 157 upon receiving the read request from the USB mass storage driver 503. The size of the transferred data (all of the data to be read) can be predicted by referring to the prediction database.

The read requests received from the USB mass storage driver 503 are also stored in the database 157 as a history database. The history database is used by the controller 156 when creating or modifying the prediction database. In other words, when a read request has been received from the USB mass storage driver 503, a past history database is referred to, and an item in which the LBA, transferred block number, and transfer direction match or are similar is copied as the prediction database. When a matching history is present, histories related thereto (for example, an item for which it can be determined, based on the LBA and the transferred block number, that sequential requests have been made) can be collected and stored in the prediction database as a single command.

Upon receiving a read request from the USB mass storage driver 503, the controller 156 can predict the amount of transferred data (all of the data to be read) by referring to the transferred block number in the prediction database. In the case where the controller 156 has predicted a data transfer of more than 64 kB, the controller 156 executes a read request to the USB host controller driver 504 so as to transfer more than 64 kB of data denoted in the prediction database, and stores the transferred data in one of the cache memories 158A to 158C.

The cache memory in which this data is stored becomes a read cache memory. The controller 156 sequentially transfers the data in the read cache memory based on the read requests transferred from the USB mass storage driver 503. Although all the data can be accurately cached in the read cache memory in the case where the upper driver 151 has sent the access information of all the data to be read, it should be noted that in cases such as where the application software 101 executes a read request directly to the USB mass storage driver 503, the upper driver 151 does not send the access information of all the data to be read, and so on, it is necessary for the controller 156 to create a prediction database upon receiving a read request from upstream. In such a case, the controller 156 may refer to the history database, as described above. For example, when the controller 156 first receives a 64 kB (or less) read request, the controller 156 predicts that a predetermined multiple's worth of data will be read, based on the starting LBA related to that read request. The prediction is carried out so that in the case where the read request for this predicted starting LBA was received from an upstream driver, a read equivalent to the predicted amount is executed, and in the case where all of the predicted data has been read from an upstream driver, a predetermined multiple's worth of data is furthermore read out from the starting LBAs related to that predicted read.

Data is read from the application software 101 in the manner described thus far.

Figure 7A:
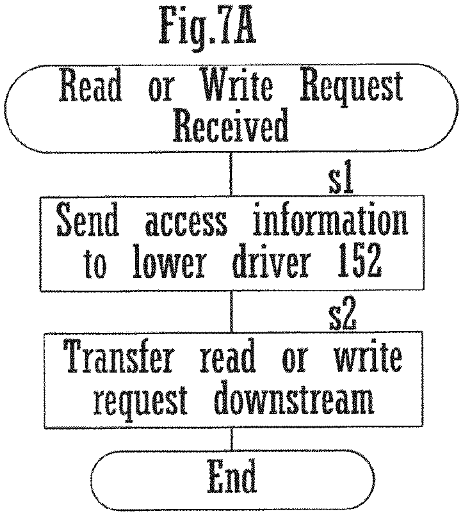
FIGS. 7A and 7B are flowcharts illustrating operations performed by the upper driver 151.

Next, operations performed by the upper driver 151 and the lower driver 152 shall be described using flowcharts. FIG. 7A is a flowchart illustrating operations performed by the upper driver 151. Upon receiving a read or write request from an application software, the upper driver 151 sends the content of that request to the lower driver 152 as access information (s1). The upper driver 151 also transfers the read or write request downstream (to the generic disk driver 502) (s2). The access information is stored in the database 157 of the lower driver 152 as a prediction database.

Figure 7B:
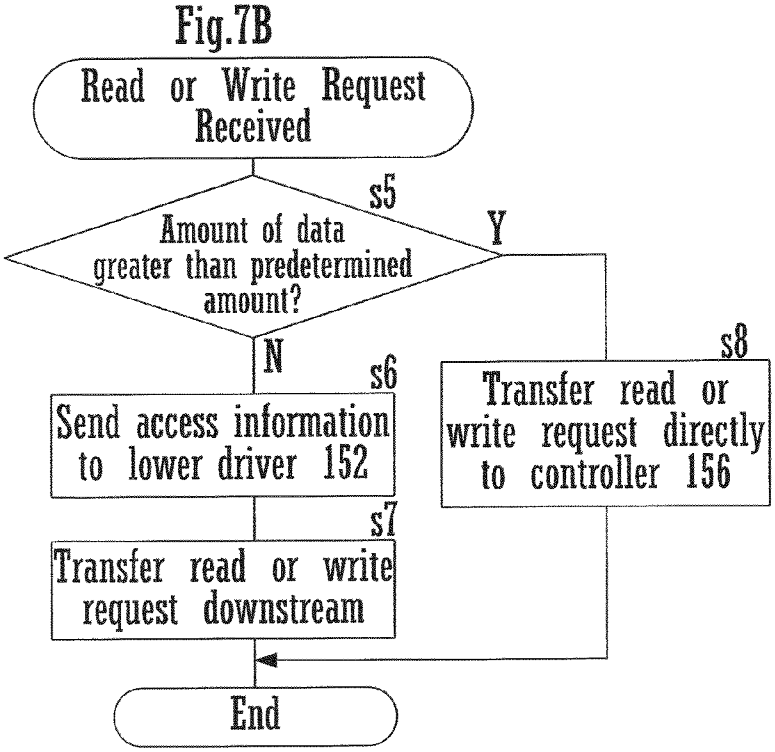
Figure 13:
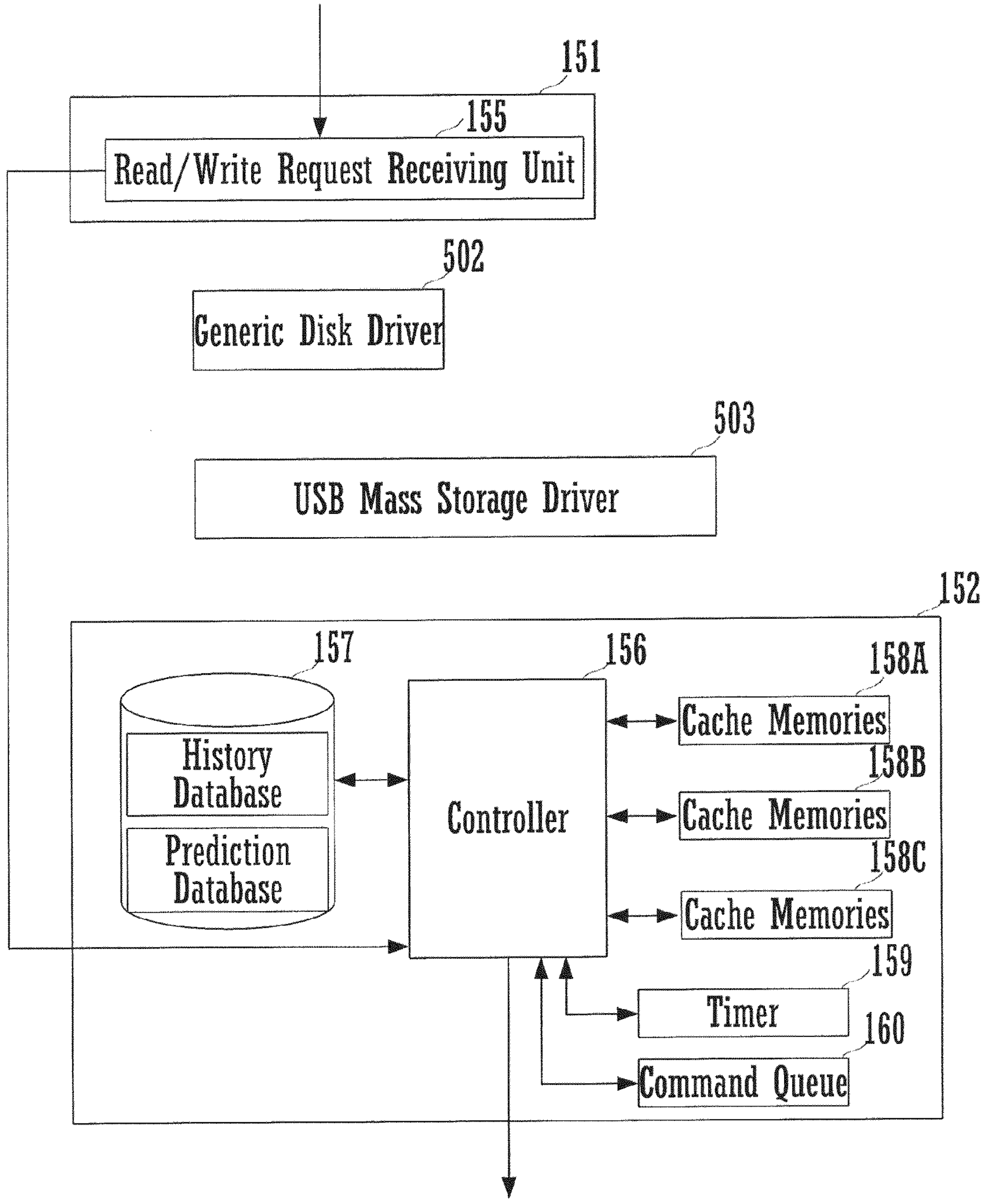
FIG. 13 is a function block diagram illustrating configurations when the upper driver 151 and the lower driver 152 perform different operations.

Note that the upper driver 151 can also operate as shown in FIG. 7B and FIG. 13. FIG. 7B is a diagram illustrating other operations performed by the upper driver 151, and FIG. 13 is a functional block diagram illustrating detailed configurations of the upper driver 151 when operating in this manner and the lower driver 152. Note that elements common with FIG. 5 are given the same reference numerals, and descriptions thereof are omitted.

In FIG. 7B, upon receiving a read or write request from the application software, the upper driver 151 determines whether or not the amount of data to be transferred is greater than a predetermined amount (for example, greater than 64 kB) (s5). If the amount of data to be transferred is not greater than the predetermined amount, the content of the request is transferred to the lower driver 152 as access information (s6), and the read or write request is transferred to the generic disk driver 502 (s7). If, however, the amount of data to be transferred is greater than the predetermined amount, the read or write request is transferred to the controller 156 of the lower driver 152 as shown in FIG. 13 (s8). In this case, the read or write request is not transferred to the generic disk driver 502. Transferring the read or write request directly to the controller 156 makes it possible to perform transfer without dividing the data into 64 kB units. Meanwhile, because the generic disk driver 502 and USB mass storage driver 503 are not used, the processing time can be shortened, resulting in further acceleration of the transfer. If the amount of data to be transferred is not greater than the predetermined amount, the USB mass storage driver 503 can process the data once, and thus the transfer is carried out downstream (to the generic disk driver 502).

Note that a determination as to whether or not the request is a read request can be substituted for the process of s5. If the request is a read request, that read request is transferred directly to the controller 156 of the lower driver 152. Because the controller 156 carries out a prediction process upon receiving a read or write request from upstream (the USB mass storage driver), a certain amount of data is read out from the device based on the prediction results and cached before being returned upstream, and thus there is the possibility that a delay equivalent to that amount will arise particularly during reads. For this reason, during read requests, the request is transferred directly from the upper driver 151 to the controller 156, and the prediction process, caching process, and so on are not performed; therefore, the transfer time (the time until the commencement of the transfer) can be shortened.

Note that only one of the determination as to whether or not the request is a read request and the determination of s5 may be performed, or both of those determinations may be performed. Alternatively, a different determination method may be used. For example, in the case where more importance is placed on reading data out from the device in advance and caching of the data (the case where the application software repeatedly accesses the same data content), the request may be transferred downstream rather than being transferred directly to the controller 156, during read requests as well. In the case where the upper driver 151 transfers read or write requests directly to the controller 156 of the lower driver 152, data is not accumulated in the cache memories. For this reason, in a case such as where the application software accesses the same file, the transfer may take place in the downstream direction so that data is accumulated in the cache memories. However, transferring the data to the lower driver 152 and copying the data into the cache memories makes it possible to accumulate the data even in the case where a read or write request has been received directly. In this case, the copying takes place within the RAM, resulting in a high copy speed and no significant drop in the processing speed.

Figure 8:
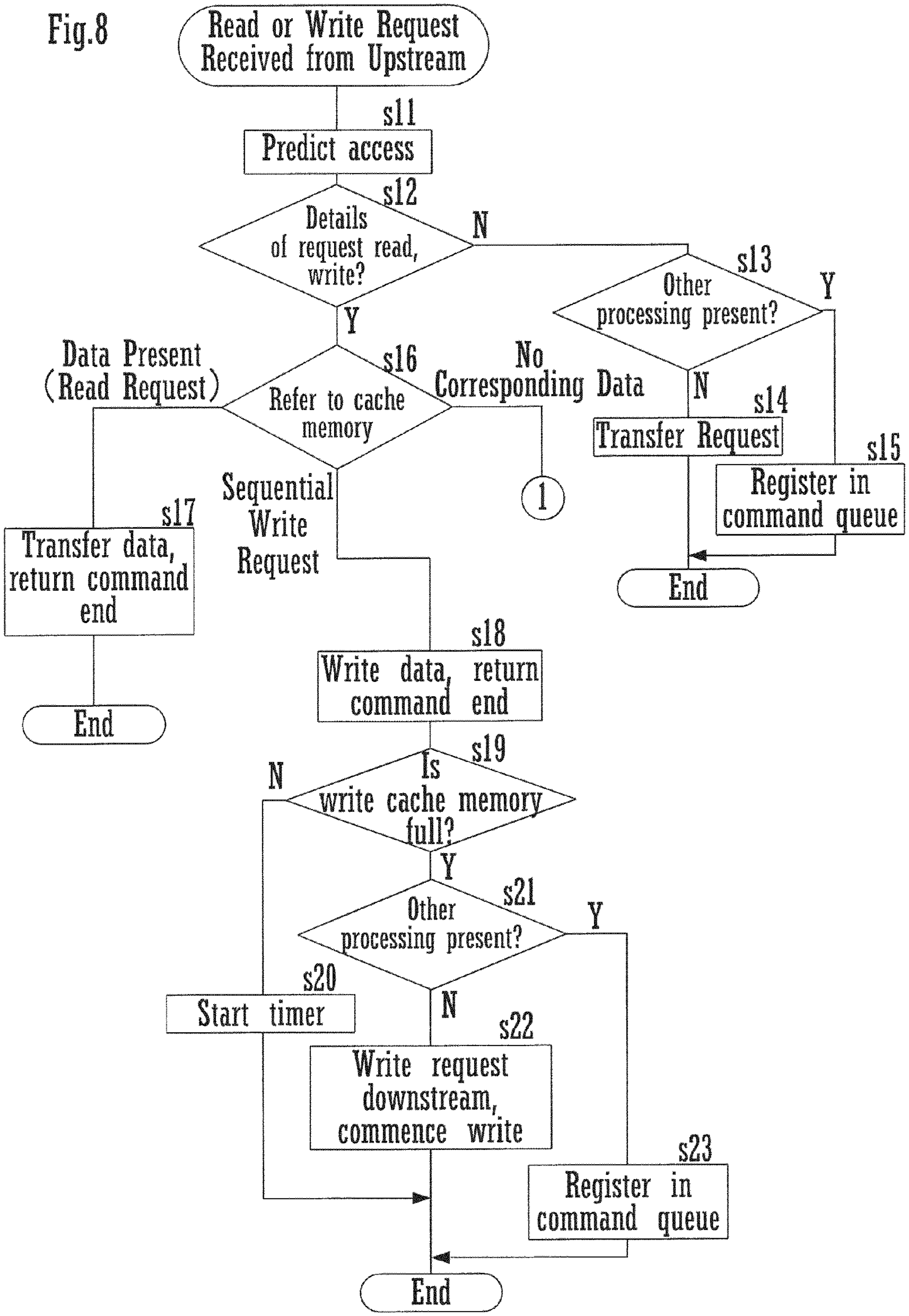
FIG. 8 is a flowchart illustrating operations performed by the lower driver 152.
Figure 9:
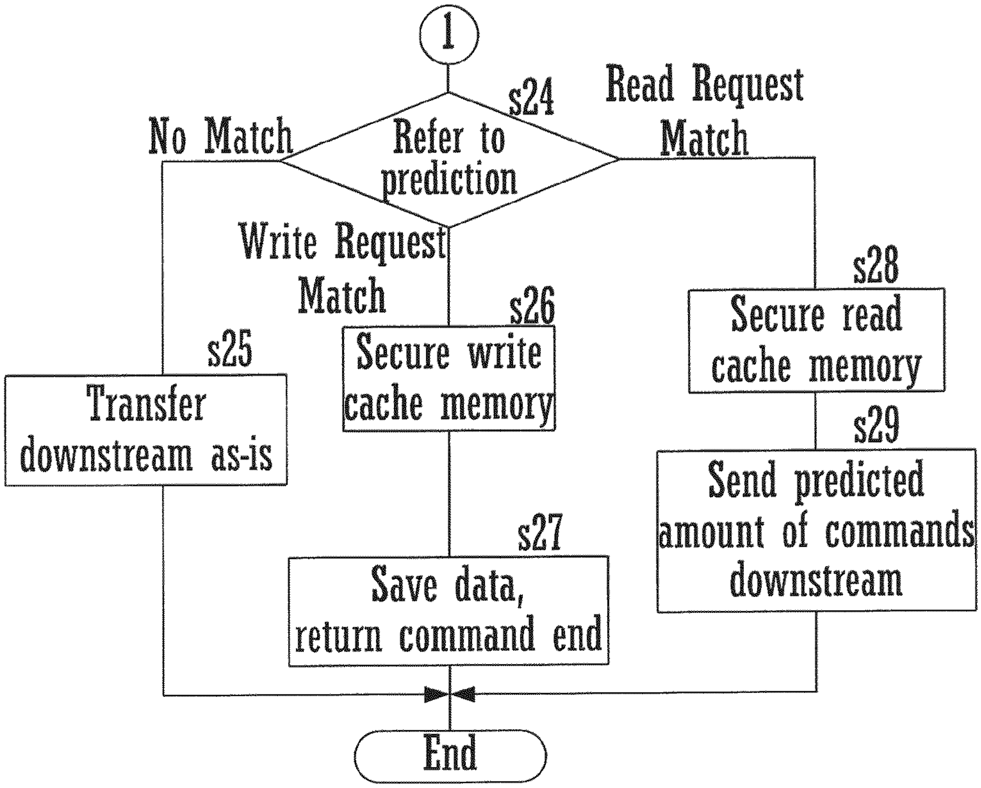
FIG. 9 is a flowchart illustrating operations performed by the lower driver 152.

FIGS. 8 and 9 are flowcharts illustrating operations performed by the lower driver 152. These operations commence upon the reception of a read request, write request, or another request from an upstream driver (the USB mass storage driver 503 or the application software 101).

First, the lower driver 152 executes an access prediction (s11). The access prediction is carried out by referring to the access information sent from the upper driver 151, the history database, and so on. The access prediction may be performed specifically as described below.

(1) File System-Based Prediction

This prediction method is a method whereby access prediction is performed by analyzing the filesystem of the external HDD 2. If, for example, the filesystem of the HDD is the FAT filesystem format, the recording locations (sectors), sizes, and so on an individual files can be determined by referring to the file management region. Therefore, when there has been a read request from an upstream application software, driver, or the like, it can be predicted that the data of the file corresponding to the recording location indicated by that request is being accessed. By performing prediction so that a read greater than the file size is not performed, unnecessary reads are not carried out, thereby eliminating wasteful processing time.

Note that because the file management region is a region that is frequently accessed, it may be read into the read cache memory and held. By accessing the file management region held in the read cache memory rather than accessing the HDD 2 every time, processing time used for access prediction can be eliminated.

(2) Prediction Based on Device Type and Content Type

This prediction method is a method whereby access prediction is performed based on the type of the device to be connected (in the embodiment described above, an HDD), the file structure of the data to be transferred (the content type), and so on. For example, in the case where the device to be connected is a DVD-ROM, and DVD-Video media has been loaded into the device, sequential reads are performed, but no write requests are made. For this reason, a prediction database is created so that data is cached until the read cache memory is full. Note that in the case where all of the data cached in the read cache memory has been read, if the cache is discarded immediately and new data is cached, the read cache memory can be used in an efficient manner.

In addition, in the case where the number and capacities of the cache memories are changed, this change can be carried out based on the device type. For example, in the case where a DVD-Video media has been loaded as described above, no write requests are made, and therefore the number of read cache memories is increased and the capacities thereof are set larger. Conversely, in the case where an unwritten DVD-R media has been loaded, mainly write requests will be made, and therefore the number of write cache memories is increased and the capacities thereof are set larger.

(3) Prediction Based on Transfer Speed Analysis

This prediction method is an application software of the aforementioned prediction based on device type and content type, and is a method whereby trends in data transfer speed are determined in accordance with the device type, and the access prediction is executed based thereupon. For example, in the case where a multilayer DVD medium has been connected, the transfer speed becomes extremely slow during random access that exceeds the boundary lines between layers. For this reason, the prediction database is created so that the frequency of accesses that straddle boundary lines between layers is low.

In addition, in the case where the number and capacities of the cache memories are changed, the change may be carried out based on the device type, trends in data transfer speeds, and so on. For example, in the case where the data transfer speed with the target device is extremely slow (for example, as with a USB MO (magneto-optical disc), which is approximately 4 MB/s), the data transfer speed is slow to begin with, and thus an improvement in transfer speed cannot be expected even if the capacities of the cache memories are increased and a large amount of data is cached. Therefore, in the case where the data transfer speed with the target device is slow, the capacities of the cache memories are set to be low, thereby suppressing RAM consumption.

(4) Method for Incrementally Increasing Data Transferred at One Time during Read Request This prediction method is a method that modifies (divides) the prediction database so that data is not transferred from the target device all at once during a read request, based on the read requests predicted through the aforementioned methods (1) through (3). For example, the prediction database is modified so that an amount of data equivalent to a predetermined multiple of the read request (for example, 4 times) is first cached. In the case where this cached data is ultimately to be transferred upstream in its entirety, the prediction database is modified so as to cache a further predetermined multiple's worth of data. The transfer time can be suppressed by sequentially increasing the amount of cached data. In addition, in the case where the actual request differed from the prediction database and no reads occurred thereafter, the wasted amount of data can be eliminated. Furthermore, repeatedly changing the capacities of the cache memories also makes it possible to suppress RAM consumption. Note that the process for modifying the prediction database may be performed when a read is actually carried out (during the processing of s29, mentioned later).

Access prediction is carried out in the above manner. Note that it is possible for the user to manually set the number and capacities of the cache memories. Furthermore, the user can also set the number of write cache memories and read cache memories to be secured. The user can increase the number of read cache memories when he/she wishes to prioritize reads, and can increase the number of write cache memories when he/she wishes to prioritize writes.

Next, in FIG. 8 and FIG. 9, the lower driver 152 determines the content of the request sent from upstream (s12). If the request is not a read or write request, it is determined whether the target device is performing another read, write, or other such process (s13), and if no processing is being performed, that request is transferred downstream (s14). If another process is being performed, that request is registered in the command queue (s15). Registering the request in the command queue makes it possible to execute the request later, after the processing has ended. In addition, in the case where a command instructing the writing of the data in the write cache memory, such as a FLUSH CACHE command, has been received, the data cached in the write cache memory at that time is transferred downstream.

In the case where the request has been determined to be a read or write request in s12, the lower driver 152 refers to the cache memories (s16). Here, if the request from upstream is a read request, and the corresponding data is cached in the read cache memory or the write cache memory, that data is transferred upstream, and a command end is returned (s17).

In the case where the request has been determined in s12 to be a write request in which sequential requests have been received from upstream, the lower driver 152 continuously writes the data into the write cache memory, and returns a command end (s16→s18). After this, it is determined whether or not the write cache memory is full (s19), and if the memory is not full, the timer is started (s20), and the operations end.

If in s19 the write cache memory is full, it is determined whether or not the target device is performing another read or write process (s21), and if no process is being performed, a write request is sent downstream and the cached data transferred (s22). If another process is being performed, that write request is registered in the command queue (s23). Registering the request in the command queue makes it possible to execute the request later, after the processing has ended.

If in s16 the lower driver 152 has determined that there is no cache data corresponding to the request from upstream, the lower driver 152 refers to the prediction database and compares the request from upstream to the content of the prediction database (s24). If the request from upstream and the content of the prediction database do not match (the LBA, transfer block number, or the like do not match), that request is transferred as-is downstream (s25). Note that if the downstream driver is performing another process at this time, the request may be registered in the command queue and executed later.

If the request from upstream is a write request, and that request and the content of the prediction database match (the LBA, transfer block number, or the like match), a write cache memory is secured (s26). Here, if there is an unused cache memory, that cache memory is secured as the write cache memory, whereas in the case where all the cache memories are being used for writes or reads, the content of the cache memory updated the least recently is cleared, and that cache memory is secured as a write cache memory. Note that the data of the write cache memory can be used as the data of the read cache memory.

After this, the data transferred from upstream is held in the secured write cache memory, and a command end is returned (s27).

If in s24 the lower driver 152 has determined that the request from upstream is a read request and that the request and the content of the prediction database match (the LBA, transfer block number, or the like match), the lower driver 152 secures a read cache memory (s28). As described above, if there is an unused cache memory, that memory is used as a read cache memory, and if there is no unused cache memory, the content of the cache memory updated the least recently is cleared and that cache memory is secured as a read cache memory.

After this, based on the prediction database, the predicted amount of read requests are sent downstream, and the data is cached in the read cache memory (s29). At this time, the data may be cached in multiple units, rather than caching a large amount of data all at once. In this case, the remaining read requests are registered in the command queue. Dividing the read request into multiple units makes it possible to transfer cached data to an upstream driver while, in parallel, caching the read data that continues thereafter, making it possible to improve the usage efficiency of the USB bus.

Figure 10:
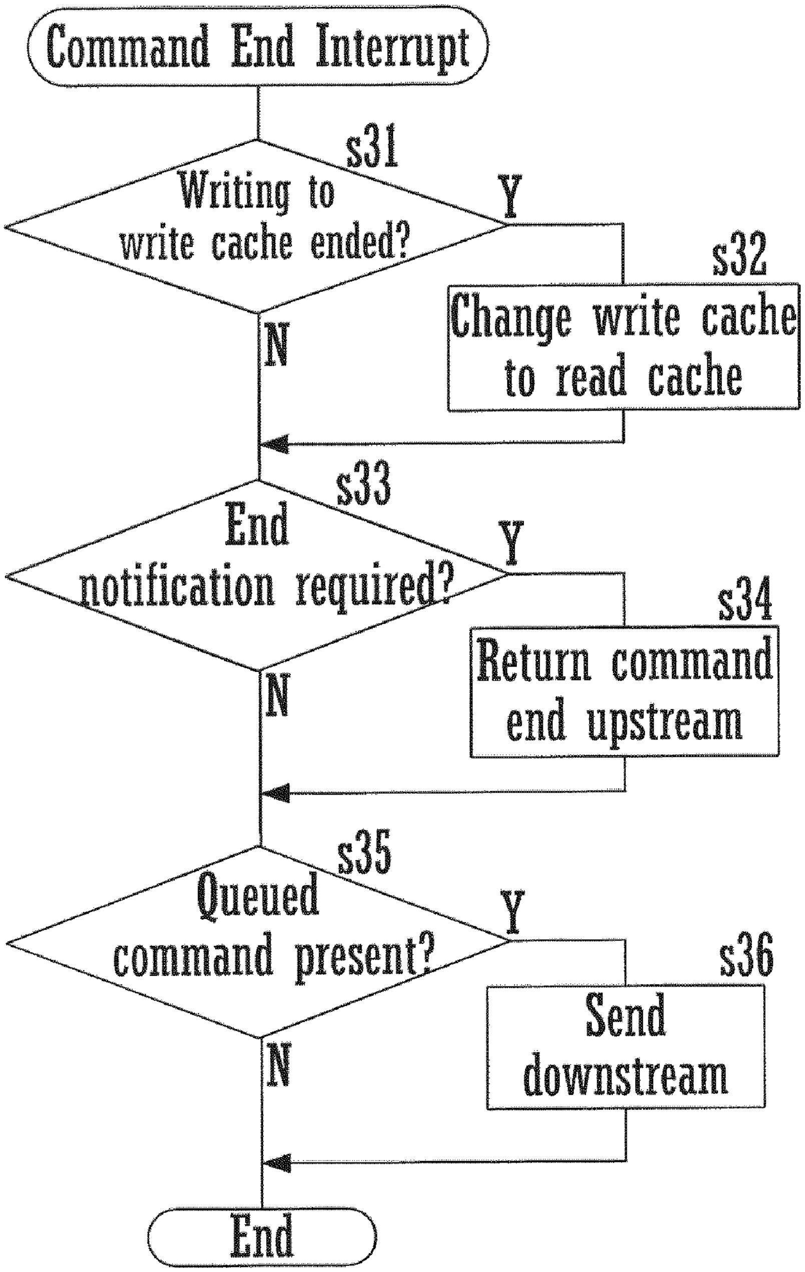
FIG. 10 is a flowchart illustrating operations performed during a command end interrupt.

Next, FIG. 10 is a flowchart illustrating operations performed when a command end interrupt has been issued from downstream.

First, the lower driver 152 determines whether or not the command end received from downstream is a command indicating that the data cached in the write cache memory has finished being written (s31). In the case where the data in the write cache memory has finished being written, that write cache memory is changed into a read cache memory (s32). Note that the timing at which the write cache memory is changed into a read cache memory is not limited to this particular timing. In addition, it is of course possible to use the data of the write cache memory as the data of the read cache memory, as described above.

After this, the lower driver 152 determines whether or not the command is a command that requires the end to be notified (transferred) upstream (s33). If this is necessary, the command end is returned upstream (s34).

Furthermore, the lower driver 152 refers to the command queue 160 and determines whether or not a queued command is present (s35). If a queued command is present, that command is transferred downstream (s36).

Figure 11A:
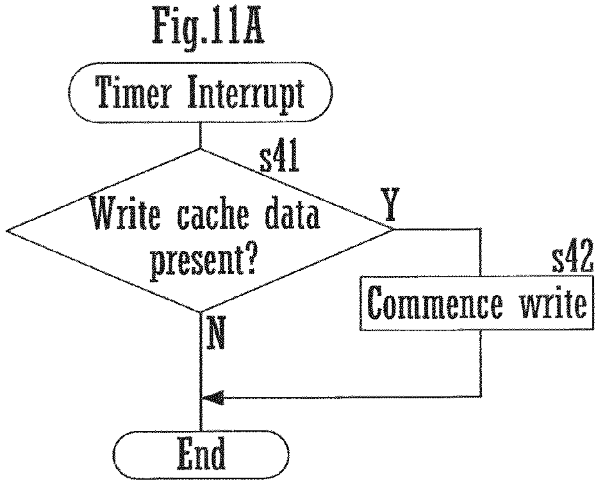
FIGS. 11A-11C are flowcharts illustrating operations performed during a timer interrupt, a reset, and driver termination.
Figure 11B:
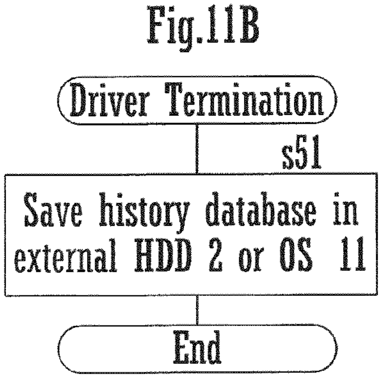
Figure 11C:
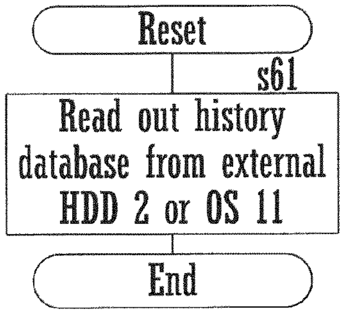

Next, FIG. 11 is a flowchart illustrating operations performed during a timer interrupt, a driver reset, and driver termination.

First, FIG. 11 (A) is a flowchart illustrating timer interrupt operations. The lower driver 152 commences these operations when the timer expires. The lower driver 152 confirms whether or not data is cached in the write cache memory (s41). If data is cached, a write request is sent downstream, the data cached in the write cache memory is transferred downstream (s42), and the operations end. If no data is cached in the write cache memory, the operations end.

FIG. 11 (B) is a flowchart illustrating operations performed during driver termination. These operations are commenced when the PC is shut down or the external HDD 2 is disconnected. The lower driver 152 copies and holds the history database into the external HDD 2 or the OS 11 (s51).

FIG. 11 (C) is a flowchart illustrating operations performed during a driver reset. These operations are commenced in the case where the PC 1 is restarted or the external HDD 2 is reconnected. The lower driver 152 reads out the history database from the external HDD 2 or the OS 11 and expands the database in the RAM, thereby constructing the database 157 (s61).

Figure 12:
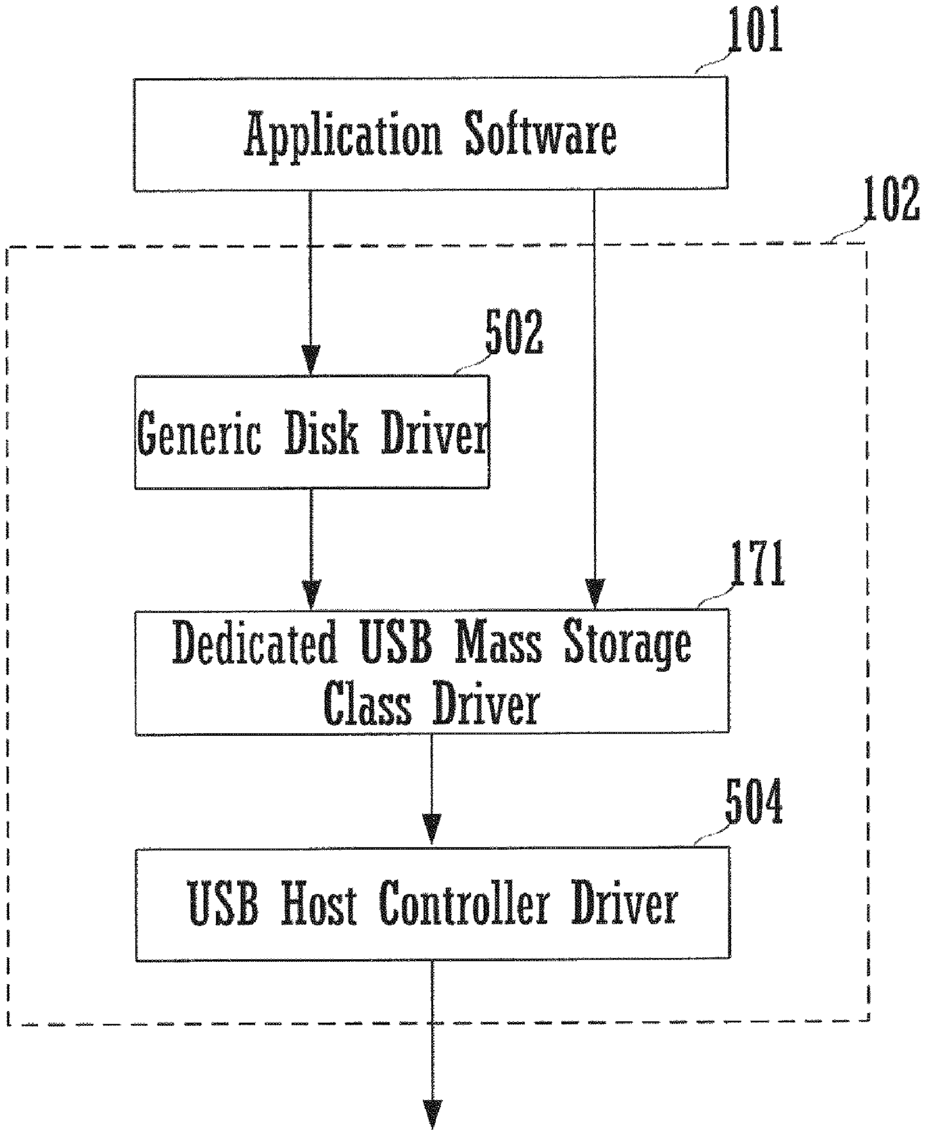
FIG. 12 is a block diagram illustrating another example for realizing the device controller according to the present invention.

Although the aforementioned embodiment illustrates an example in which the upper driver 151 and the lower driver 152 are implemented and connected to the generic disk driver 502 or the USB mass storage driver 503, it should be noted that the device controller of the present invention can also be realized in a form in which the USB mass storage driver is replaced with a dedicated driver. FIG. 12 is a functional block diagram illustrating an example in the case where the USB mass storage driver has been replaced with a dedicated driver. Note that elements common with FIG. 4 are given the same reference numerals, and descriptions thereof are omitted.

Figure 1:
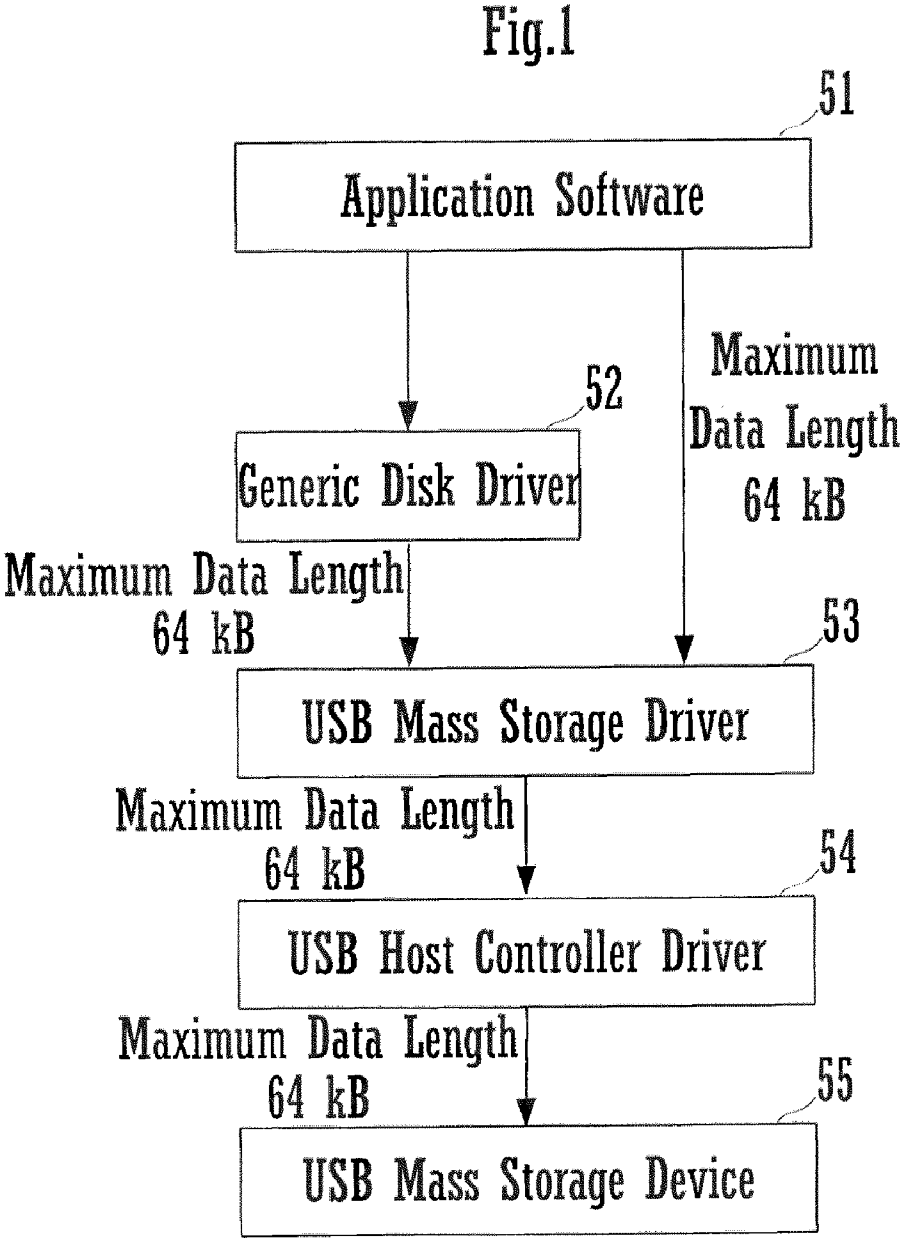
FIG. 1 is a block diagram illustrating a PC and an external HDD connected by a USB interface.

In this example, a dedicated USB mass storage class driver 171, connected to the USB host controller driver 504, the generic disk driver 502, and the application software 101, is provided. The dedicated USB mass storage class driver 171 is a driver that replaces the conventional standard USB mass storage driver (see FIG. 1).

This dedicated USB mass storage class driver 171 includes, as in the aforementioned embodiment, cache memories, and caches data in accordance with read and write requests received from upstream. The operations performed by the dedicated USB mass storage class driver 171 are the same as the operations performed by the lower driver illustrated in FIGS. 8 to 10.

In this example, too, the application software 101 divides the data into 64 kB units, and in the case where a read or write request has been issued, the dedicated USB mass storage class driver 171 caches the data in the cache memories, and then transfers the data.

Note that the dedicated USB mass storage class driver 171 has no data transfer size upper limit of 64 kB, and is capable of processing read or write requests of a size greater than 64 kB. Therefore, because the application software 101 or the generic disk driver 501 are capable of issuing read or write requests without making divisions into 64 kB units, delay caused by processing commands and statuses is kept low, and data transfer can be made fast.

The invention claimed is:

1. A device controller connected between an application software or device driver and a target device, the application software or device driver dividing a read or write request to the target device into plural commands at an upper limit on a data transfer size and sequentially sending the divided commands, the device controller comprising:

- a cache memory that caches data received from the application software or device driver and data received from the target device; and
- a control unit that transfers the data cached in the cache memory to the target device and the application software or device driver,
- wherein upon receiving a write request of the upper limit on the data transfer size, the control unit:
  - predicts that the write request corresponds to a data transfer of more than the upper limit on the data transfer size;
  - returns upstream a command complete for each of the commands;
  - sequentially caches data transferred from the application software or device driver into the cache memory;
  - issues a command for a data transfer size which is greater than the upper limit on the data transfer size of each command divided by the application software or device driver; and transfers the data in the cache memory to the target device, and
- wherein upon receiving a read request of the upper limit on the data transfer size, the controller:
  - predicts that the read request corresponds to a data transfer of more than the upper limit on the data transfer size before issues a command for a data transfer size which is greater than the upper limit on the data transfer size of each command divided by the application software or device driver;
  - reads out data from the target device;

caches the data into the cache memory; and thereafter transfers the data to the application software or device driver from the cache memory in a case where data corresponding to a command of a read request which has been sequentially sent from the application software or device driver is cached in the cache memory.

2. The device controller according to claim 1, wherein the control unit includes an upper control unit connected upstream of the device driver, and a lower control unit connected downstream of the device driver, wherein the upper control unit: sends to the device driver, a read or write request to the target device; and sends to the lower control unit, access information indicating all data to be read or written, wherein upon receiving a write request from the device driver, and further receiving access information indicating all data to be written from the upper control unit, the lower control unit sequentially caches data transferred from upstream into the cache memory till receipt of a command for all data, and wherein upon receiving a read request from the device driver, and further receiving access information indicating all data to be read from the upper control unit, the lower control unit:

issues a command for reading all data;

reads out from the target device all data; and caches the all data into the cache memory.

3. The device controller according to claim 2, wherein the target device is a USB mass storage device.

4. The device controller according to claim 3, wherein the target device is operated by a USB mass storage driver provided in an operating system as a standard.

5. The device controller according to claim 2, wherein the target device is operated by a USB mass storage driver provided in an operating system as a standard.

6. The device controller according to claim 1, wherein the target device is a USB mass storage device.

7. The device controller according to claim 6, wherein the target device is operated by a USB mass storage driver provided in an operating system as a standard.

8. The device controller according to claim 1, wherein the target device is operated by a USB mass storage driver provided in an operating system as a standard.

* * * * *